R. C. BIERBOWER.
ELECTRICAL TESTING DEVICE.
APPLICATION FILED JUNE 11, 1918.

1,335,647.

Patented Mar. 30, 1920.
2 SHEETS—SHEET 1.

Witness
Edwin J. Beller.

Inventor
Richard C. Bierbower.
by Wilkinson & Giusta
Attorneys.

R. C. BIERBOWER.
ELECTRICAL TESTING DEVICE.
APPLICATION FILED JUNE 11, 1918.
1,335,647. Patented Mar. 30, 1920.
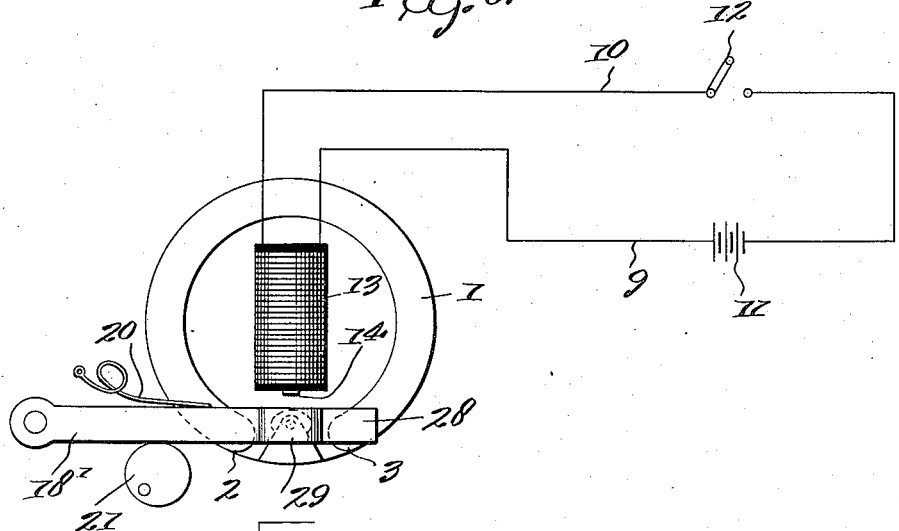
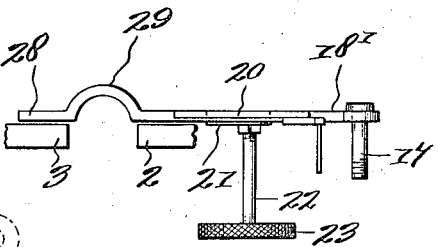
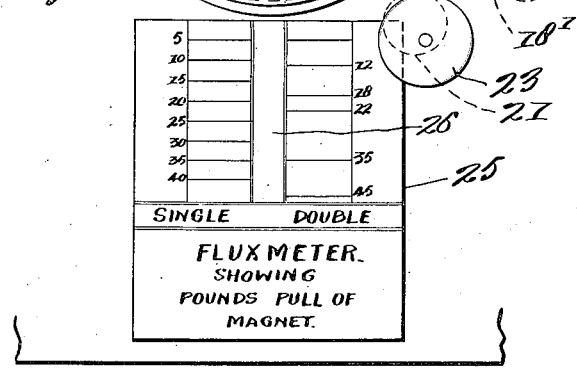

UNITED STATES PATENT OFFICE.

RICHARD C. BIERBOWER, OF SAN ANTONIO, TEXAS, ASSIGNOR TO TESTALL ELECTRIC MANUFACTURING CO., OF SAN ANTONIO, TEXAS, A CORPORATION OF TEXAS.

ELECTRICAL TESTING DEVICE.

1,335,647.           Specification of Letters Patent.     Patented Mar. 30, 1920.

Application filed June 11, 1918. Serial No. 239,455.

*To all whom it may concern:*

Be it known that I, RICHARD C. BIERBOWER, a citizen of the United States, residing at San Antonio, in the county of Bexar and State of Texas, have invented certain new and useful Improvements in Electrical Testing Devices; and I do hereby declare the following to be a full, clear, and exact description of the invention, such as will enable others skilled in the art to which it appertains to make and use the same.

The present invention relates generally to improvements in electrical testing devices, and more specifically to an improved fluxmeter for testing the strength of magnets.

It is the object of my present invention to provide an improved instrument of this character which is exceedingly simple in construction, economical to manufacture, and adaptable for use in a quick and efficient manner wherever the strength of single or double magnets is to be ascertained.

In the accompanying drawings forming a part of this application, and in which similar reference symbols indicate corresponding parts in the several views:

Fig. 6 is a view similar to Fig. 1 and showing a slight modification of the instrument.

Fig. 7 is a front elevational view of the device shown in Fig. 6, and

Fig. 8 is a horizontal sectional view taken on the line 8—8 in Fig. 7 with the omission of certain parts.

Figure 2:
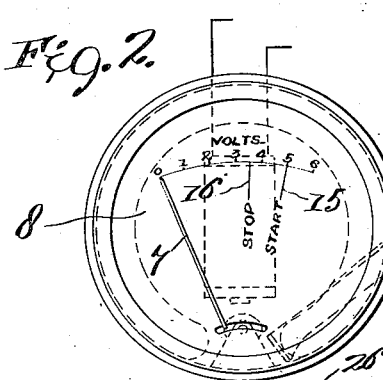
Fig. 2 is a front elevational view thereof.
Figure 5:
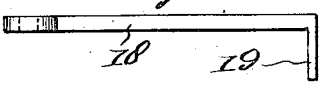
Fig. 5 is a plan view of the magnetic bar.

Referring more particularly to that form of my invention shown in Figs. 1 to 5, 1 designates a permanent magnet of substantially circular form having its pole pieces 2 and 3 separated to provide a gap 4 in which is pivoted an armature 5 in brackets 6. The armature carries a pointer 7 movable over a scale marked off on a dial 8, as shown in Fig. 2; said armature 5 being adapted to be yieldingly held by the magnetic influence exerted thereon by the permanent magnet 1 in a position where the pointer 7 will normally rest at an origin or initial point on the scale on said dial 8 (see Fig. 2).

A circuit 9, 10, which includes a battery or other source of current 11, and a switch 12 is arranged to energize or excite an electromagnet 13, the core 14 of which is disposed above the armature 5 and when the circuit 9, 10, is closed through the switch 12, said core 14 is adapted to influence the armature 5 in opposition to the restraining force of the permanent magnet 1, whereby to cause said armature to be turned in the brackets 6, which results in the deflection of the pointer 7 to the right in Fig. 2 over the scale or the dial 8. This scale in Fig. 2 is marked off with graduations which represent the voltage of the battery or other source 11 included in the circuit 9, 10, and the parts above described are those employed in the well known Deprez-Carpenter voltammeter.

In addition to the voltage graduations on the scale on said dial 8 are also marked off thereon a graduation 15 shown in Fig. 2 at which is placed the word "start" and also a second graduation 16 denominated on said dial "stop"; these graduations 15 and 16 being for a purpose hereinafter more fully described.

Pivoted, as indicated at 17, on the instrument board or other part which carries the fluxmeter is a bar 18, preferably of iron, and which is formed with a bent end 19 of a high magnetic permeability. This bent end 19 is adapted to project into the gap 4 and to lie in sliding contact with one of the pole pieces 2 of the permanent magnet 1, said end being adapted to be moved toward or away from the armature 5 accordingly as said bar 18 is swung in the one or the other direction, and when said bent end 19 approaches the armature 5 it brings the magnetic influence of the permanent magnet 1 which permeates it into closer effective relation to said armature 5 and increases the magnetic effect thereon, which results in causing the armature to be turned in a manner tending to bring the pointer 6 back to the origin or initial point on the scale. A spring 20 bears on the upper side of the pivoted bar 18 and constantly tends to urge said bar downwardly to remove the bent end 19 as far as possible away from the armature 5, where it will be substantially without effect, and under such circumstances the armature 5 is under the influence only of the pole pieces 2 and 3. A cam 21 held on a stem 22 and adapted to be revolved by a hand wheel 23, bears beneath the magnetic bar 18 and serves to lift the same and the bent end 19 so that the latter may be caused to approach the armature 5 for a purpose to be hereinafter more fully described.

Figure 1:
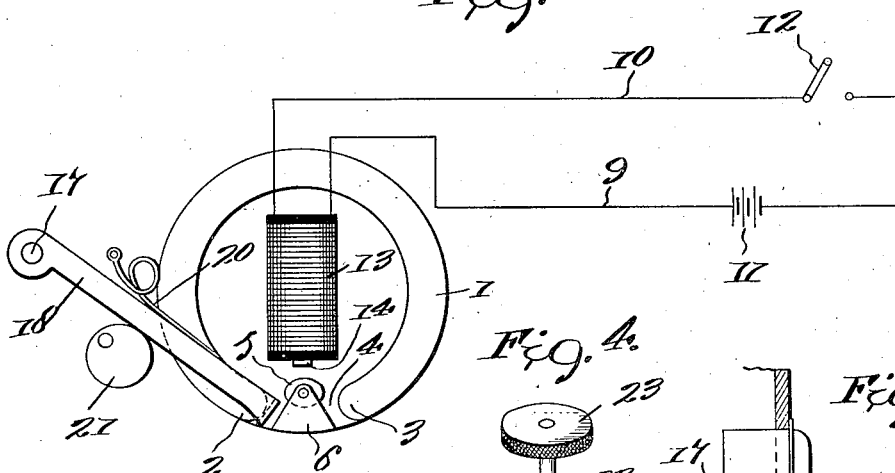
Figure 1 is a rear elevational view with a circuit diagram showing one form of a fluxmeter constructed in accordance with my present invention.
Figure 4:
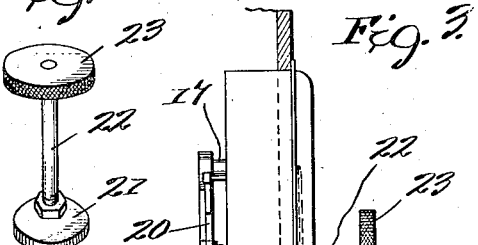
Fig. 4 is a perspective view of the cam and its operating device.
Figure 3:
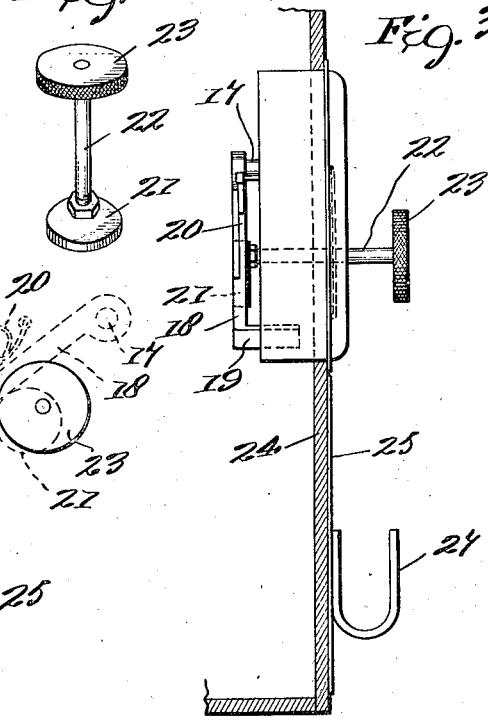
Fig. 3 is a vertical sectional view with parts shown in elevation and indicating the manner of applying the magnet to be tested.

The device as above described is, as shown in Fig. 3, preferably mounted in a base board 24 on which is placed a table 25 bearing two sets of graduations representing the strength of single and double magnets in the pounds pull that they possess. These graduations with their markings are clearly seen in Fig. 2, there being a central runway or path indicated at 26 on the table extending directly beneath the armature 5, and upon which the magnet to be tested is to be placed and moved up toward said armature 5. A magnet to be tested is indicated at 27 in Fig. 3. The instrument, of course, is adapted to operate with only a single pole of the magnet 27 to be tested, and either the north or the south pole of said magnet 27 will consequently have to be placed on the runway 26, in accordance with the magnetic character of the other parts of the fluxmeter.

The operation of this device is substantially as follows:

Before placing a magnet 27 to be tested on the table 25, the switch 12 is closed, causing current from the battery 11 to circulate through the circuit 9, 10, and energizing the electromagnet 13 and magnetizing its core 14. The magnetic field set up by the core 14 is in opposition to and greater than the magnetic field produced by the pole pieces 2 and 3 of the permanent magnet 1, and thus the armature 5 will be turned under the influence of the core 14 carrying therewith the pointer 7 which is deflected across the scale on the dial 8. The battery 11 will preferably be of a strength of six volts, and if such battery is up to full strength the needle 7 will be deflected to the point 6 on said scale. However, the voltage of the battery 11 will vary, and the point to which the needle is deflected will therefore vary in accordance with the variations in the battery voltage. As this battery voltage is therefore uncertain the point on the scale to which the pointer 7 is first deflected is therefore an unreliable point at which to commence the test, and it is therefore necessary to employ a compensating device which will cause the needle to be moved to a starting position independently of the voltage of the battery 11. This compensating device is provided by the bar 18 and associated parts.

By turning the hand wheel 23 the cam 21 may be rotated to swing the bar 18 upwardly, causing the bent end 19 thereof to approach more closely to the armature 5 and to bring the magnetic influence of the pole piece 2 into more effective relation thereto. As it is the tendency of the permanent magnet 1 to return the armature and pointer to the initial position shown in Fig. 2, so the approach of the bent end 19 will influence the armature 5 to turn back and the pointer to move to the left over the scale as viewed from Fig. 2. The cam is rotated to cause the bent end 19 to approach the armature 5 until the pointer arrives at the graduation 15 marked "start." This new position of the pointer is entirely independent of any fluctuations in voltage in the battery 11, and the apparatus is now in condition for the test.

With its proper pole selected and applied to the runway 26 at the bottom of the table 25, the magnet 27 to be tested is moved slowly up over said runway 26 and toward the armature 5. As said magnet 27 to be tested moves nearer to the armature 5 its magnetic effect thereon will gradually become greater, this magnetic effect being in opposition to the magnetic effect produced by the core 14 of the electromagnet 13. The magnet 27 to be tested coming from the opposite direction has, therefore, an effect if moved close enough, to neutralize the effect of the electromagnet 13 on the armature 5. Under this counter-effect of the magnet 27 to be tested, the armature 5 is therefore gradually released from the magnetic embrace of the electromagnet 13 and allowed to be turned in the reverse direction by the weaker influence of the permanent magnet 1. The magnet 27 to be tested is thus moved gradually upward on the runway 26 until its counter-effect is such that the needle 7 has been allowed to return to the graduation 16 marked "stop." This is an arbitrary point selected on the scale with which the tables 25 agree. This "stop" point 16 will usually be found by making preliminary tests with magnets of known strength. It will be well understood that this "stop" point 16 and the tables 25 are coördinated, so that when the needle 7 arrives at said "stop" point 16 the number opposite the graduation on the table 25 at which the magnet 27 to be tested has arrived, will show immediately the strength of the magnet in pounds pull.

Referring more particularly to the modified form of the invention shown in Figs. 6 to 8, parts similar to those shown and described in connection with the form of the invention illustrated in Figs. 1 to 5 inclusive are similarly numbered and operate in the same manner, so that a repetition is not thought necessary.

This form of the invention differs from that previously described in that the magnetic bar 18', instead of being formed with the right-angularly bent end, has its end 28 extending substantially in alinement with the body of the bar and while the latter is adapted to swing up close to or into contact with the pole piece 2 of the permanent magnet 1, said end 28 is adapted to come close to or into contact with the other pole piece 3; in this way the device acting in effect as a keeper for the permanent magnet 1. I find it necessary to provide a bulged or offset part 29 in the magnetic bar 18' in order to avoid striking the armature 5 or its bracket.

The "start" point 15' on the scale in this instance is also rearranged, it being substantially at the point 6 of the voltage scale.

The operation of this form of the invention is substantially as follows:

The pointer rests at the initial point of the scale under the influence of the permanent magnet 1, and when energized by closing the switch 12 the electromagnet 13 will draw the pointer 7 to, say, for instance, some intermediate point between the graduations 4 and 5, this being preferably the strength of the battery 11 desirable. The keeper 18' being in the lowered position where it is held by the spring 20 will now be raised by rotating the hand wheel 23 which turns the lobe of the cam 21. This raised position of the keeper is indicated in Figs. 6 and 7. The keeper will, of course, destroy the magnetic flux passing through the gap 4, and the effect of the permanent magnet 1 will thereby be lost to the armature 5.

The consequence of this will be the deflection of the pointer 7 over the scale to the graduation marked 6, at which is also the "start" point 15'.

The device is now in condition for the test, and a magnet such as the magnet 27 shown in Fig. 3, is applied to the table 25 and moved up toward the armature 5. This magnet to be tested will oppose its magnetic effect to that of the electromagnet 13, and will, therefore, cause the pointer 7 to gradually move to the left over the scale, and when such pointer arrives at the "stop" mark the number on the table will indicate the strength of the magnet to be tested.

It is obvious that those skilled in the art may vary the details of construction and arrangements of parts without departing from the spirit of my invention, and therefore I do not wish to be limited to such features except as may be required by the claims.

I claim:

1. An electrical testing device of the character described including a permanent magnet, an armature positioned in the gap of said permanent magnet, a pointer carried by said armature, a dial having a scale over which said pointer is adapted to move, said permanent magnet adapted to influence said armature whereby to yieldingly retain the pointer at the zero graduation on said scale, an electromagnet adapted to exert a contrary influence on said armature overbalancing the influence of said permanent magnet whereby to cause said pointer to move over said scale, a circuit for said electromagnet, magnetic means operative when said electromagnet is excited and independent of the latter for causing said armature and pointer to be shifted from the position to which moved by said electromagnet, and a table arranged at the side of said armature opposite to that at which the electromagnet is disposed, said table adapted to receive the magnet to be tested, the magnet to be tested adapted to be moved along said table toward said armature until it influences the latter and the pointer to arrive at a predetermined graduation on said scale, whereupon the table will indicate the strength of said magnet to be tested, substantially as described.

2. An electrical testing device of the character described including a dial having a scale, a pointer movable over said scale, magnetic means for yieldingly holding said pointer at an origin point on said scale, other magnetic means for causing said pointer to be moved from the origin point, means for causing said pointer to be deflected from the position to which last moved, and a table for receiving a magnet to be tested, said pointer adapted to be deflected again by the presence of the magnet to be tested on said table, substantially as described.

3. An electrical testing device of the character described including a dial having a scale including "stop" and "start" graduations, a pointer arranged to move over said scale, means for yieldingly holding said pointer at an origin point on said scale, means for causing said pointer to be moved over said scale in opposition to the influence of said first named means, means independent of said last named means for causing the deflection of said pointer from the position to which last moved to said "start" graduation, and a table adapted to receive a magnet to be tested, said pointer adapted to be deflected from the "start" to the "stop" graduation on said scale by the magnet to be tested, substantially as described.

4. An electrical testing device of the character described including a dial having a scale thereon including "start" and "stop" graudations, a pointer adapted to move over said scale, magnetic means for yieldingly holding said pointer in and returning said pointer to an initial position on said scale, other means for causing said pointer to be moved over said scale in opposition to the force exerted by said magnetic means, means associated with said magnetic means for causing said pointer to be deflected from the position to which moved by said other means and to said "start" graduation, and a table for receiving a magnet to be tested, said pointer adapted to be deflected by said magnet to be tested, the magnet to be tested being moved to a position on said table where its influence will cause the pointer to arrive at said "stop" graduation, substantially as described.

5. An electrical testing device of the character described including a dial having a scale including "start" and "stop" graduations, a pointer adapted to move over said dial, an armature carrying said pointer, magnetic means for influencing said armature to cause said pointer to yieldingly assume an initial position on said scale, electromagnetic means for causing the movement of said armature and deflection of said pointer away from the initial position in opposition to said first named magnetic means, means for changing the effect of said first named magnetic means on said armature after said electromagnetic means has been energized whereby to cause the pointer to be deflected to said "start" graduation, and a table adapted to receive a magnet to be tested, said armature adapted to be influenced and moved by said magnet to be tested to cause the deflection of said pointer from said "start" to said "stop" position as the magnet to be tested is moved over said table, the table containing graduations and figures adapted to show the strength of the magnet, substantially as described.

6. An electrical testing device of the character described including a dial having a scale provided with "start" and "stop" graduations, a pointer movable over said scale, an armature connected to move said pointer, a permanent magnet having its pole pieces arranged at opposite sides of said armature and adapted to yieldingly hold said armature with the pointer at an initial position on said scale, an electromagnet adapted to move said armature and pointer from said initial position, a circuit for said electromagnet, a magnetic bar associated with said permanent magnet and adapted to vary the effect of said permanent magnet on said armature, means for moving said bar with reference to said permanent magnet to cause the armature to be moved until said armature arrives at the "start" graduation on said scale, and a table for receiving a magnet to be tested, the armature adapted to be influenced by the magnet to be tested, said table adapted to indicate the strength of the magnet to be tested when said pointer is finally deflected to said "stop" graduation, substantially as described.

7. In an electrical testing device of the character described, the combination of a dial having a scale provided with "start" and "stop" graduations, a pointer moving over said scale, an armature connected to move said pointer, a permanent magnet having its pole pieces adapted to embrace said armature and influence the same to cause said pointer to remain at an initial position on said scale, an electromagnet adapted to move said armature to cause the pointer to be deflected from said initial position, a magnetic pivoted bar associated with said permanent magnet and adapted to be moved relatively thereto in order to vary the effect of said permanent magnet on said armature, means for shifting said bar relatively to said permanent magnet until said pointer is brought to said "start" graduation, means for constantly tending to move said bar in the opposite direction when said last named means is removed, and a table adapted to receive a magnet to be tested, said armature adapted to be deflected by said magnet to be tested, said table indicating the strength of the magnet when said pointer arrives at the "stop" graduation, substantially as described.

8. An electrical testing device of the character described including a scale having "start" and "stop" graduations, a pointer movable over said scale, an armature connected to move said pointer, a permanent magnet having its pole pieces embracing said armature, said permanent magnet adapted to influence said armature to retain said pointer at an initial position on said scale, an electromagnet adapted to influence said armature to cause the pointer to be deflected from said initial position, means for exciting said electromagnet, a pivoted magnetic bar associated with said permanent magnet and adapted to vary the effect of said permanent magnet on said armature, a spring bearing on said pivoted bar and constantly and yieldingly tending to move said bar to an initial position where it will have a minimum effect on said armature, a cam bearing on said bar for causing said bar to be moved in opposition to said spring and into more effective relation to said armature, means to rotate said cam, said magnetic bar being adapted to be moved until said pointer is deflected to the "start" graduation on said scale, and a table adapted to receive a magnet to be tested, said armature being adapted to be moved under the influence of the magnet to be tested, the scale adapted to show the strength of said magnet when the pointer indicates the "stop" graduation, substantially as described.

9. An electrical testing device of the character described including a permanent magnet having a gap, an armature pivoted in said gap, an electromagnet, a circuit for said electromagnet including a source of current, a pointer movable with said armature, a scale over which said pointer is adapted to move, a pivoted magnetic bar having one end adapted to come in contact with one of the poles of said permanent magnet, means for moving said bar with respect to said permanent magnet pole and armature, and a table over which a magnet to be tested is moved toward said armature, substantially as described.

10. An electrical testing device of the character described including a permanent magnet having a gap, an armature pivoted in said gap, an electromagnet adapted to influence said armature, a circuit for said electromagnet having a source of current, means to open and close said circuit, a pointer movable with said armature, a scale over which said pointer is adapted to move, a pivoted magnetic bar having a bent end arranged between one of the poles of said permanent magnet and said armature, said bent end being of high magnetic permeability and forming in effect an extension of said pole of the permanent magnet, means for moving said bar to cause said bent end to approach closer to said pivoted armature, and a table over which a magnet to be tested is adapted to be moved toward said armature, substantially as described.

In testimony whereof I affix my signature.

RICHARD C. BIERBOWER.